United States Patent
Klein et al.

(10) Patent No.: US 10,860,238 B2
(45) Date of Patent: Dec. 8, 2020

(54) METHOD AND APPARATUS FOR IMPROVING FIRMWARE LOADING

(71) Applicant: Intel Corporation, Santa Clara, CA (US)

(72) Inventors: Binyamin Zeev Klein, Jerusalem (IL); Ehud Hershkovitz, Jerusalem (IL)

(73) Assignee: INTEL CORPORATION, Santa Clara, CA (US)

( * ) Notice: Subject to any disclaimer, the term of this patent is extended or adjusted under 35 U.S.C. 154(b) by 399 days.

(21) Appl. No.: 15/854,846

(22) Filed: Dec. 27, 2017

(65) Prior Publication Data
US 2019/0050151 A1 Feb. 14, 2019

(51) Int. Cl.
G06F 3/06 (2006.01)
G06F 13/28 (2006.01)
G06F 9/445 (2018.01)
G06F 21/44 (2013.01)
G06F 21/57 (2013.01)
G06F 9/4401 (2018.01)

(52) U.S. Cl.
CPC ............ G06F 3/065 (2013.01); G06F 3/0604 (2013.01); G06F 3/0673 (2013.01); G06F 9/445 (2013.01); G06F 13/28 (2013.01); G06F 21/44 (2013.01); G06F 21/572 (2013.01); G06F 9/4401 (2013.01)

(58) Field of Classification Search
CPC ........ G06F 3/0604; G06F 3/065; G06F 3/061; G06F 3/064; G06F 21/572; G06F 21/575; G06F 21/71; G06F 21/72; G06F 9/3004; G06F 9/30043; G06F 9/44505; G06F 9/5016; G06F 9/30098; G06F 9/3802; G06F 9/3836; G06F 11/00; G06F 11/1048; G06F 11/3644; G06F 11/1417
See application file for complete search history.

(56) References Cited

U.S. PATENT DOCUMENTS

| | | | | |
|---|---|---|---|---|
| 6,003,112 | A * | 12/1999 | Tetrick | G06F 13/1605 711/100 |
| 6,425,053 | B1 * | 7/2002 | Considine | G06F 3/061 710/74 |
| 7,299,358 | B2 * | 11/2007 | Chateau | G06F 21/10 713/165 |
| 7,539,831 | B2 * | 5/2009 | Sun | G06F 9/5016 711/170 |
| 7,552,302 | B1 * | 6/2009 | Tene | G06F 9/3001 711/167 |
| 2009/0019262 | A1 * | 1/2009 | Tashiro | G06F 9/30098 712/208 |
| 2011/0080392 | A1 * | 4/2011 | Hare | G09G 3/344 345/208 |

(Continued)

*Primary Examiner* — Tae K Kim
(74) *Attorney, Agent, or Firm* — Viering Jentschura & Partner MBB

(57) ABSTRACT

A processing device comprises a memory comprising memory blocks configured to store bit values, wherein bit values of an initial memory block are set to a target value; a memory controller configured to perform control of copying bit values from at least one source memory block to at least one destination memory block; the memory controller being configured to perform: copying the set bit values to the at least one destination memory block, subsequently copying the set bit values and the copied bit values to further destination memory blocks.

20 Claims, 6 Drawing Sheets

(56) References Cited

U.S. PATENT DOCUMENTS

| | | | | |
|---|---|---|---|---|
| 2013/0070137 A1* | 3/2013 | Kelly | .................... | H04N 5/3572 |
| | | | | 348/302 |
| 2015/0301821 A1* | 10/2015 | Danne | ...................... | H04L 67/06 |
| | | | | 717/169 |
| 2016/0026577 A1* | 1/2016 | Goodwin | ................ | G06F 12/04 |
| | | | | 711/118 |
| 2016/0165519 A1* | 6/2016 | Abraham | .............. | H04W 48/08 |
| | | | | 370/329 |
| 2017/0102892 A1* | 4/2017 | Pusukuri | ............... | G06F 12/109 |
| 2017/0147356 A1* | 5/2017 | Kotary | .................... | G06F 3/065 |
| 2017/0185486 A1* | 6/2017 | Kumar | ................. | G06F 3/0659 |
| 2017/0255406 A1* | 9/2017 | Tomishima | ............ | G11C 16/20 |
| 2018/0181336 A1* | 6/2018 | Lovelace | ................ | G06F 21/79 |
| 2018/0218773 A1* | 8/2018 | Bandic | ............... | G11C 13/0038 |
| 2018/0246711 A1* | 8/2018 | Kurosawa | ................. | G06F 8/65 |
| 2018/0307529 A1* | 10/2018 | Koker | .................... | G06F 9/522 |
| 2019/0018746 A1* | 1/2019 | Haid | ..................... | G06F 9/4405 |

\* cited by examiner

METHOD AND APPARATUS FOR IMPROVING FIRMWARE LOADING

TECHNICAL FIELD

Various embodiments relate generally to processing devices configured to perform memory initialization operations.

BACKGROUND

In various technological fields, processors can be configured to receive firmware necessary for operation of a particular device, e.g. such as a vehicle backup camera and corresponding audio equipment from a memory such as a ROM, EPROM or flash memory. A security engine may be provided for authenticating and loading such firmware from said memory to a system memory. In addition to authenticating the firmware, such security engines may be configured to initialize the system memory by setting bit values within the system memory to a target value e.g. of zero.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1A:
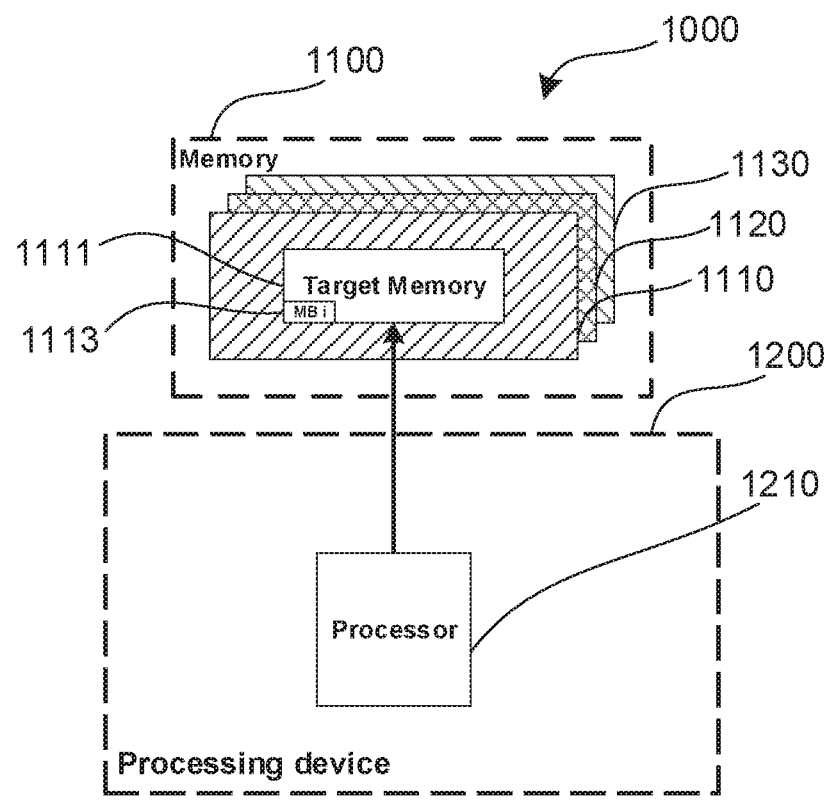
FIG. 1A shows an exemplary block diagram of a system that includes a memory and a processing device.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one. The terms "proper subset", "reduced subset", and "lesser subset" refer to a subset of a set that is not equal to the set, i.e. a subset of a set that contains less elements than the set.

As used herein, the term "memory", "memory device", and the like may be understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™ technology, etc., or any combination thereof. Furthermore, registers, shift registers, processor registers, data buffers, etc., are also embraced herein by the term memory. A single component referred to as "memory" or "a memory" may be composed of more than one different type of memory, and thus may refer to a collective component comprising one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

A volatile memory may be a storage medium that requires power to maintain the state of data stored by the medium. Non-limiting examples of volatile memory may include various types of RAM, such as dynamic random access memory (DRAM) or static random access memory (SRAM). One particular type of DRAM that may be used in a memory module is synchronous dynamic random access memory (SDRAM). In some aspects, DRAM of a memory component may comply with a standard promulgated by Joint Electron Device Engineering Council (JEDEC), such as JESD79F for double data rate (DDR) SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

Various aspects may be applied to any memory device that includes non-volatile memory. In one aspect, the memory device is a block addressable memory device, such as those based on negative-AND (NAND) logic or negative-OR (NOR) logic technologies. A memory may also include future generation nonvolatile devices, such as a 3D XPoint™ technology memory device, or other byte addressable write-in-place nonvolatile memory devices. A 3D XPoint™ technology memory may include a transistor-less stackable cross-point architecture in which memory cells sit at the intersection of word lines and bit lines and are individually addressable and in which bit storage is based on a change in bulk resistance.

According to various aspects, the term "volatile" and the term "non-volatile" may be used herein, for example, with reference to a memory, a memory cell, a memory device, a storage device, etc., as generally known. These terms may be used to distinguish two different classes of (e.g., computer) memories. A volatile memory may be a memory (e.g., computer memory) that retains the information stored therein only while the memory is powered on, e.g., while the memory cells of the memory are supplied via a supply voltage. In other words, information stored on a volatile memory may be lost immediately or rapidly in the case that no power is provided to the respective memory cells of the volatile memory. A non-volatile memory, in contrast, may be a memory that retains the information stored therein while powered off. In other words, data stored on a non-volatile memory may be preserved even in the case that no power is provided to the respective memory cells of the non-volatile memory. Illustratively, non-volatile memories may be used for a long-term persistent storage of information stored therein, e.g., over one or more years or more than ten years. However, non-volatile memory cells may also be programmed in such a manner that the non-volatile memory cell becomes a volatile memory cell (for example, by means of correspondingly short programming pulses or a correspondingly small energy budget introduced into the respective memory cell during programming).

In some aspects, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magneto resistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The terms memory or memory device may refer to the die itself and/or to a packaged memory product.

The term memory cell, as referred to herein, may be understood as a building block of a (e.g., computer) memory. The memory cell may be an electronic circuit configured to store one or more bits. The one or more bits may be associated to at least two voltage levels that can be set and read out (e.g., a logic 0, a logic 1, or in multi bit memory cells, a combination thereof). A plurality of memory cells of the same memory type may be addressable within a single electronic device, e.g., within a single memory device. Further, there may be hybrid electronic devices (e.g., memory devices) including a plurality of memory cells of the different memory types respectively.

The term "hardware" may generally refer to, but not be limited to, an element having a physical structure such as electronic, electromagnetic, optical, electro-optical, mechanical, electromechanical part, etc.

The term "software" may generally refer to, but not be limited to, any type of executable instruction, including firmware. The term "software" may generally refer to a logical structure, a method, a procedure, a program, a routine, a process, an algorithm, a formula, a function, an expression, etc.

The term "firmware" may generally refer to, but not be limited to, a logical structure, a method, a procedure, a program, a routine, a process, an algorithm, a formula, a function, an expression, etc. that is implemented or embodied in a hardware structure (e.g, flash memory, read only memory, erasable read only memory). Examples of firmware may include microcode, writable control store, micro-programmed structure. When implemented in software or firmware, the elements of various aspects described herein may essentially be the code segments to perform the necessary tasks. The software/firmware may include the actual code to carry out the operations described in various aspects, or code that emulates or simulates the operations. The program or code segments can be stored in a processor or machine accessible medium. The "processor readable or accessible medium" or "machine readable or accessible medium" may include any medium that can store, transmit, or transfer information including any one of memory or memory device described above.

The term "processor" may generally refer to, but not be limited to, any machine that is capable of executing a sequence of instructions (e.g., macro- or microinstructions), and may generally include, but not be limited to, general purpose microprocessors, special purpose microprocessors.

FIG. 1A is an exemplary block diagram of a system 1000 that includes a memory 1100 with a plurality of exemplary memory devices 1110, 1120, 1130. The number of three memory devices 1110, 1120, 1130 is only for illustrative purposes and the number of memory devices of memory 1100 is scalable to any number. Exemplarily, memory device 1110 may include a subrange of memory space referred to as target memory 1111 in FIG. 1A. Each memory or memory device 1110, 1120, 1130 may include a plurality of memory blocks forming corresponding memory space. Exemplarily, one of such plurality of memory blocks is referred to as MB i 1113 being part of the target memory 1111.

System 1000 further includes a processing device 1200 including a processor 1210. The processor 1210 may in various aspects be a primary processor such as a central processing unit (CPU) or any peripheral processor. Processor 1210 may be part of a computing platform for running an operating system (OS) and software that may perform memory access and control operations (as illustrated exemplarily by the arrow in FIG. 1A). Processor 1210 may include one or more separate processors. Each processor may include a single and/or a multicore processor. In various aspects, processing device 1200 may be implemented as a system on a chip (SOC), or be implemented with standalone components.

When starting processing systems such as control systems of automotive components, software such as firmware of such automotive components is loaded into a respective memory. For example, firmware of automotive cameras such as vehicle rear or vehicle backup cameras e.g. for park assistance with corresponding audio may be loaded into a corresponding memory upon power-on of a vehicle. A memory device holding firmware when a system is turned off, i.e. before the loading operation, may e.g. be a memory device selected from but not limited to a group of read-only memory (ROM), erasable programmable read-only memory (EPROM), or an electronic (solid-state) non-volatile computer storage such as a flash memory device. In various aspects, a memory to which e.g. such firmware is loaded is initialized before the firmware or software is loaded thereon, e.g. to meet security requirements. Upon initialization, an initial value or a target value is assigned to bit values of respective memory blocks of the memory. The target value may in various aspects be a zero value, while a corresponding initialization procedure may in these aspects be referred to as zeroing procedure.

Figure 2A:
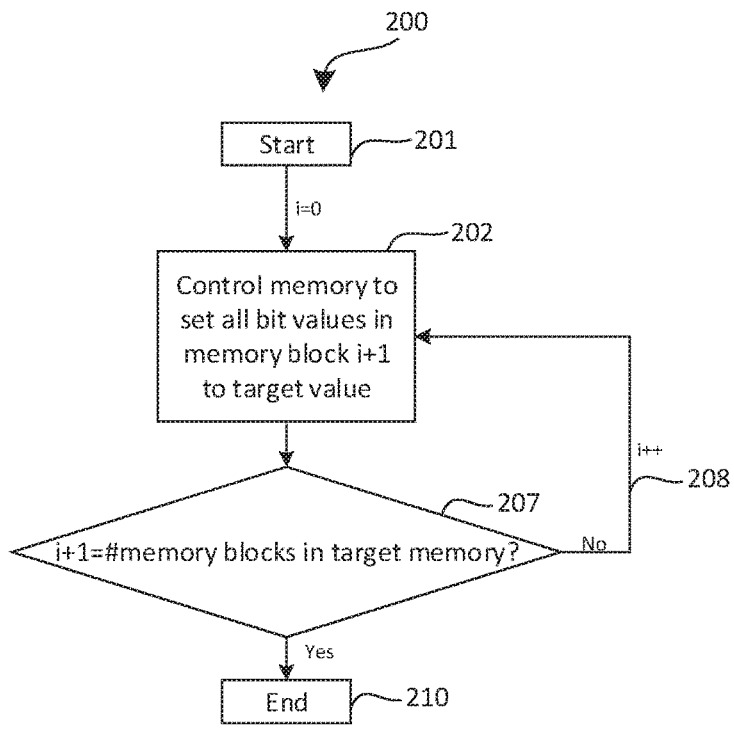
FIG. 2A shows a method for initializing a memory space the processing device may execute using the internal configuration shown in FIG. 1A.
Figure 2B:
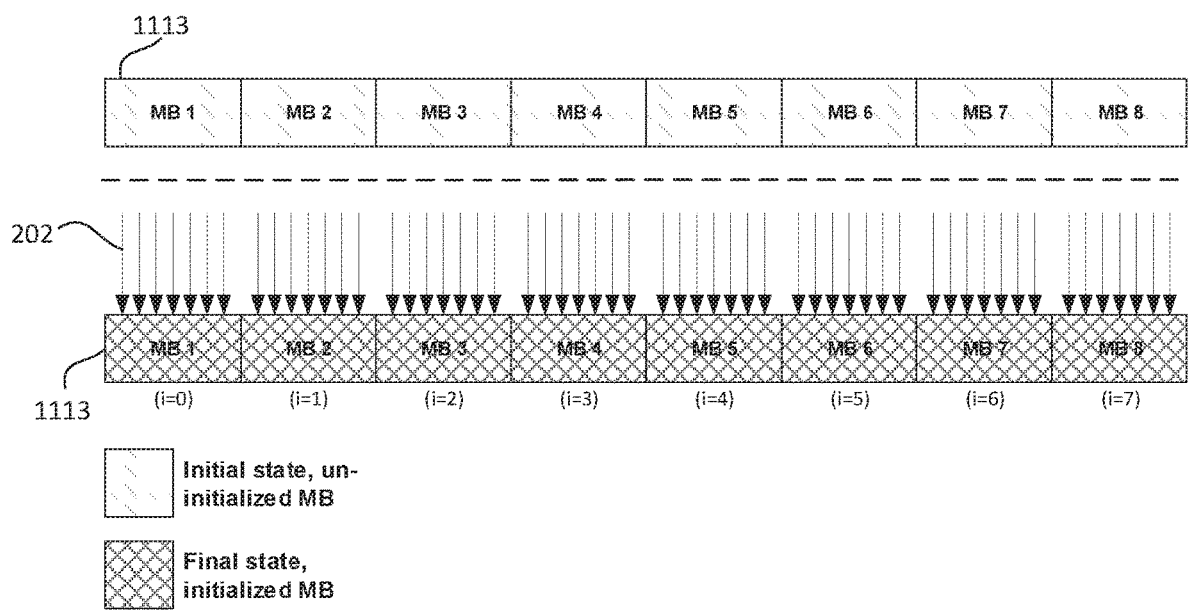
FIG. 2B illustrates results of method in terms of un-initialized and initialized memory blocks.

FIG. 2A illustrates an exemplary method 200 for initializing a memory space such as target memory 1111 within memory block 1113 which processing device 1200 may execute using the internal configuration shown in FIG. 1A. FIG. 2B illustrates results of stage 202 in terms of un-initialized and initialized memory blocks. After starting the method 200 at stage 201, e.g. upon key-on or power-on of an automotive control system, bit values of a plurality of memory blocks are set to an initial value, a target value, e.g. of zero at stage 202. A corresponding plurality of memory blocks MB 1 to MB 8 is illustrated in FIG. 2B, the shown number of eight memory blocks being only exemplarily for conciseness of the figure.

A memory may in various aspects of the present disclosure include $2^N$ memory blocks with N being a positive integer. Typical sizes of a target memory 1111 may range in between several Megabytes (MB) to tens or hundreds of Megabytes. For example, in certain aspects, a size of the target memory 1111 may be in between for example 1 MB and 128 MB, or for example in between for example 1 MB and 64 MB, or for example in between for example 1 MB and 32 MB. A typical size of the target memory may thus be for example of the group consisting of, but not limited to, 128 MB, 64 MB, 32 MB. A typical size of a memory block 1113 may be in a range of a few bytes (B) to a few kilobytes (KB). For example, in certain aspects, a size of a memory block 1113 may be in between for example 1 B and 16 KB, or for example in between for example 1 B and 8 KB, or for example in between for example 1 B and 4 KB. A typical size of a memory block may thus be for example of the group consisting of, but not limited to, 16 KB, 8 KB, 4 KB. In various aspects, a size of a memory block may for example be 100 times, 500 times or 1000 times the register size of the processor. A size of a memory block may in various aspects be much bigger that the register size of the processor (usually more than 1000 times).

As illustrated by arrows in FIG. 2B, the processing of stage 202 may in various aspects be a sequential writing processing, where values of bits within a memory block are set or written to a target value sequentially in units of a largest register size of processor 1210, e.g. of a used central processing unit (CPU). Typical register sizes may in various aspects include e.g. 32 bit (i.e. 4 bytes) and 64 bits (i.e. 8 bytes). As illustrated in stage 202 of FIG. 2A the processor 1210 may thus control e.g. the memory 1100 to set bit values in a memory block (e.g. MB 1 in FIG. 2A) to a target value by sequentially setting groups of bits corresponding to the register size to said target value, e.g. to zero. After a first memory block (e.g. MB 1 in FIG. 2A) is initialized in this way, i.e. when all bit values are set to the target value, the processing may proceed via stage 208 (e.g. by incrementing a counter index i by 1) again to stage 202 to perform an initialization operation at a next memory block (e.g. MB 2 in FIG. 2A). Repeating stage 202 a number of times corresponding to a number of memory blocks (8 in the exemplary case of FIG. 2B), the method 200 may in certain aspects sequentially set all memory blocks 1113 (e.g. from MB 1 to MB 8) to the target value. When in stage 207 all memory blocks have been initialized by setting bits in respective memory blocks to zero (e.g. when a counter value i+1 equals the number of memory blocks), the method ends at stage 210. In various aspects, stage 220 of method 200 may be implemented as software in the processor 1210 and may for example be an operating system (OS) application programming interface (API) which in certain aspects is referred to as "memset".

In certain technological areas, start time requirements or boot time requirements may be strict requiring e.g. a rear camera and corresponding audio to be in operation or operable within a short time after power-on (e.g. key-on in automotive applications). In various aspects, a copying operation may be applied instead of a writing operation with the effect being a reduction in processing time. Given typical hardware configurations, the number $T_{MEM}(X$ bytes) being a time it takes to set X bytes to a target value of e.g. zero using the writing ("memset") operation, and the number $T_{DMA}(X$ bytes) being a time it takes to copy X bytes to a destination memory block using the copying operation (performed by the memory controller 2220, e.g. a DMA engine), $T_{MEM}(X$ bytes) is considerably larger than $T_{DMA}(X$ bytes) ($T_{MEM}(X$ bytes)$\gg T_{DMA}(X$ bytes)). A reason for this relation may be mainly attributed to the fact that using the writing operation ("memset"), a corresponding software needs to perform the writing processing (e.g. zeroing) on very small granularity (4 to 8 bytes) limited e.g. by a largest register size of the processor 2210. In order to initialize e.g. the target memory, said software needs to sequentially call the writing operation (e.g. the "memset" API) a large number of times.

Figure 1B:
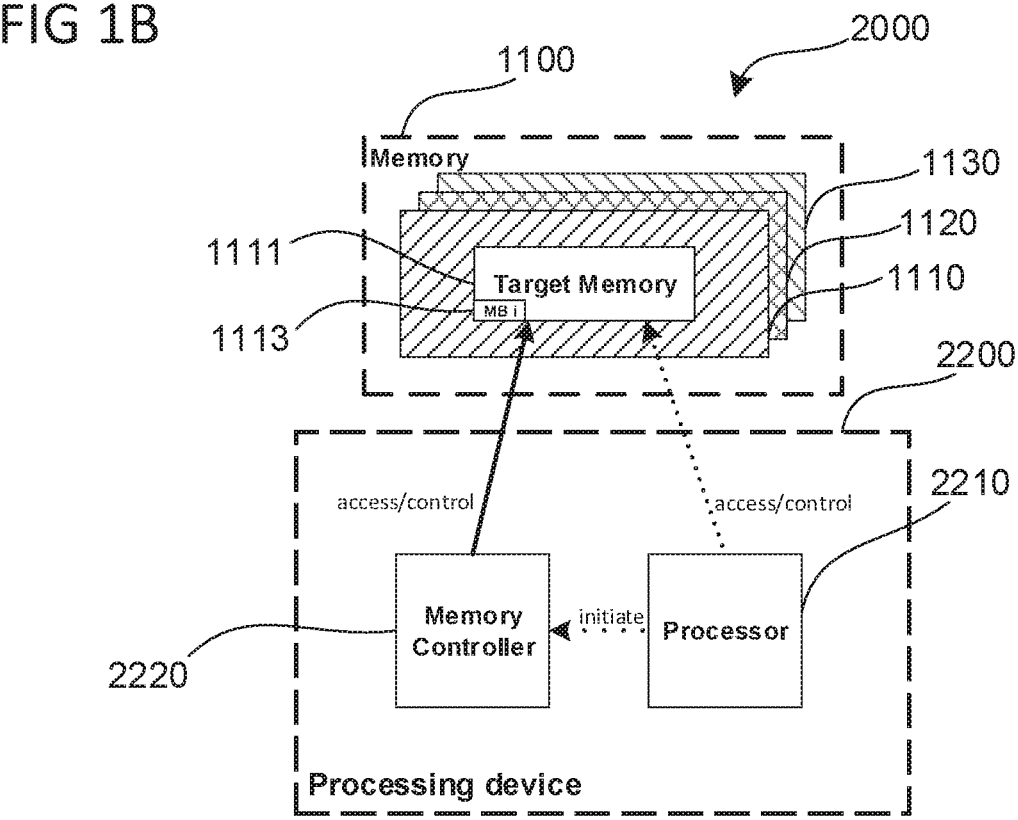
FIG. 1B shows an exemplary block diagram of a system that includes a memory and a processing device.

FIG. 1B shows an exemplary block diagram of a system 2000 that includes a memory 1100 and a processing device 2200. Like reference characters refer to the same parts shown also in FIG. 1A and a corresponding description is omitted for purposes of conciseness. In FIG. 1B, the processing device 2200 includes a processor 2210, which in various aspects may be a primary processor such as a central processing unit (CPU) or any peripheral processor. Processor 2210 may be part of a computing platform for running an operating system (OS) and software that may perform memory access and control operations (as illustrated exemplarily by the dashed arrow in FIG. 1B). Processor 2210 may include one or more separate processors. Each processor may include a single and/or a multicore processor. In various aspects, processing device 2200 may be implemented as a system on a chip (SOC), or be implemented with standalone components.

The processing device 2200 of FIG. 1B further includes a memory controller 2220. It is appreciated that while processor 2210 and memory controller 2220 are shown separately in FIG. 1B, this depiction generally serves to highlight the operation of processing device 2200 on a functional level. Processor 2210 and memory controller 2220 can therefore each be implemented as separate hardware components and/or software components, or processor 2210 and memory controller 2220 can be combined into a unified hardware and/or software component (for example, a hardware-defined circuitry arrangement including circuitry to perform multiple functions, or a processor configured to execute program code that defines instructions for multiple functions). In various aspects of the present disclosure, the memory controller 2220 is implemented as hardware component of the processing device 2200. In various aspects, the memory controller 2220 is a hardware engine implemented in the processing device 2200. For example, the processing device 2200 may be a system on a chip component including the memory controller 2220. An effect achieved by these various aspects may include that processor 2210 may be free for carrying out operations while memory controller 2220 carries out own operations. In various aspects of the present disclosure, the memory controller 2220 may be a direct memory access (DMA) engine implemented as hardware of the processing device 2200.

In certain aspects, memory controller 2220 is configured to access the memory 1100 and/or any one of memory devices 1110, 1120, 1130. The memory controller 2220 is in various aspects configured to control operations of the memory 1100 and/or of memory devices 1110, 1120, 1130. In various aspects of the present disclosure, the memory controller 2220 is configured to perform control of copying (e.g. transferring) bit values from at least one source memory block to at least one destination memory block. In other words, in various aspects, the memory controller 2220 is configured to perform copying processing, i.e. stages of copying or to copy bit values from at least one source memory block to at least one destination memory block. In various aspects, memory controller 2220 may access memory 1100 and/or any one of memory devices 1110, 1120, 1130 essentially independently from processor 2210. In other words, the processor 2210 may initiate memory access by the memory controller 2220 and may than be able to perform other operations while memory controller 2220 may perform control of copying operations.

Figure 3A:
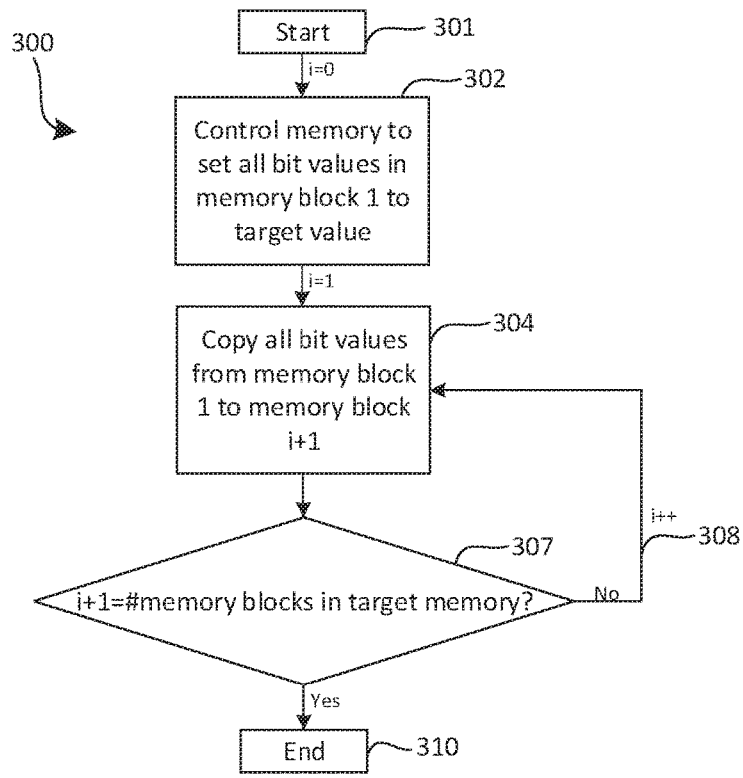
FIG. 3A shows a method for initializing a memory space that a processing device may execute using the internal configuration shown in FIG. 1B.
Figure 3B:
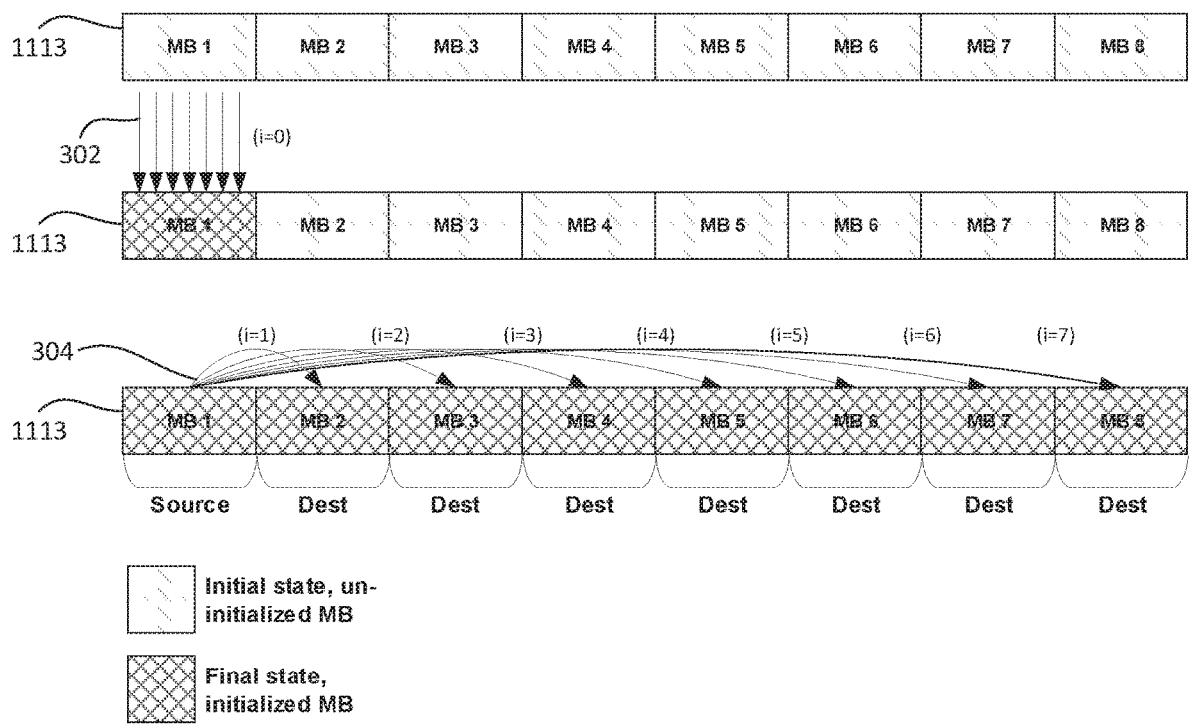
FIG. 3B illustrates results of a method in terms of un-initialized and initialized memory blocks.

FIG. 3A illustrates exemplary method 300 for initializing a memory space such as target memory 1111 within memory block 1113 which processing device 2200 may execute using the internal configuration shown in FIG. 1B. FIG. 3B illustrates results of stages 302 and 304 in terms of un-initialized and initialized memory blocks. After starting the method 300 at stage 301, e.g. upon key-on or power-on of an automotive control system, bit values of an initial memory block (memory block MB 1 in FIG. 3B) within memory blocks of target memory 1111 are set to a target value, e.g. of zero at stage 302. The processing performed at stage 302 of FIG. 3A corresponds to the processing performed at stage 202 in FIG. 2A described above. As indicated by the arrows in FIG. 3B, at stage 302, for example the processor 2210 of the processing device 2200 the processor 2210 may thus control e.g. the memory 1100 to set bit values in the initial memory block to the target value by sequentially setting groups of bits corresponding to the register size to said target value, e.g. to zero.

In stage 304 shown in FIG. 3A, the memory controller is configured to copy the bit values set to the target value in stage 302 to a different memory block (MB 2 in FIG. 3B) which memory block thus functions as destination memory block for the copying process while the initial memory block (MB 1 in FIG. 3B) functions as source memory block. The copying operation is indicated by a corresponding arrow starting at memory block MB 1 in FIG. 3B and ending at memory block MB 2 in FIG. 3B. As further indicated by following arrows starting at said initial memory block to further destination memory blocks (MB 3 to MB 8 in FIG. 3B), passing via stage 308 (e.g. each time incrementing a corresponding counter index), the copying processing of stage 304 is repeated until all memory blocks ((MB 1 to MB 8 in FIG. 3B) are initialized. It is appreciated that as in the case of FIG. 2B, a plurality of memory blocks MB 1 to MB 8 illustrated in FIG. 3B is shown exemplarily and the number of eight memory blocks is used exemplarily for conciseness purposes and not to be limiting to the disclosure. When in stage 307 all memory blocks within the target memory 1111 are initialized by setting bits in respective memory blocks to zero (e.g. when a counter value i+1 equals the number of memory blocks), the method ends at stage 310.

Figure 5:
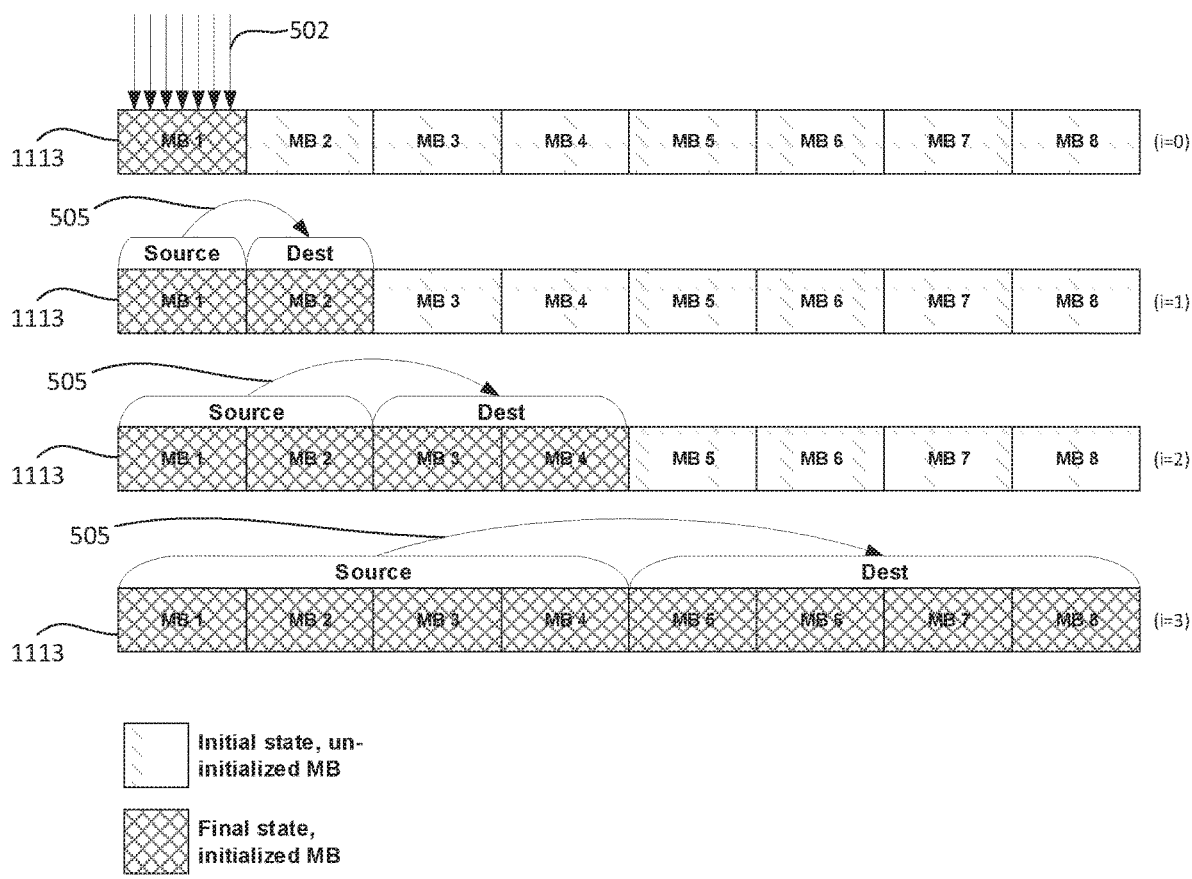
FIG. 5 illustrates results of a method in terms of un-initialized and initialized memory blocks.

Various aspects of the present disclosure employ combinations of sequential writing processing (as e.g. in stages 202, 302 in FIGS. 2A and 3A) and copying processing (as in stage 304 in FIG. 3A) in order to meet strict requirements regarding e.g. a start time or boot time of electronic control systems such as automotive electronic control systems e.g. after power-on. In various aspects, a processing device comprises a memory comprising memory blocks configured to store bit values, wherein, in certain aspects all, bit values of an initial memory block are set to a target value. For example, bit values of memory block MB 1 1113 shown in FIG. 3B are set to a target value e.g. of zero at stage 302. Similarly, FIG. 5 shows bit values of a memory block MB 1 1113 to be set to a target bit value (i=0). In various aspects, the memory controller is further configured to perform control of copying, in certain aspects all, bit values from at least one source memory block to at least one destination memory block. In other words, said processing device is configured to perform a copying operation e.g. in accordance with stage 304 of FIG. 3A. Thus, in various aspects, the memory controller is configured to perform copying the set bit values to the at least one destination memory block, e.g. as illustrated in FIG. 3B or in FIG. 5 (i=1). In various aspects, the memory controller is configured to subsequently copy the set bit values and the (i.e. all) copied bit values to further destination memory blocks, e.g. as illustrated in FIG. 5 (i=2). In various aspects, the memory controller is configured such that the copying the set bit values and the copied bit values to further destination memory blocks is repeated at least once e.g. as illustrated in FIG. 5 (i=3). In various aspects, the stage of copying the set bit values and the copied bit values to further destination memory blocks may thus be repeated until a memory is entirely initialized.

Figure 4:
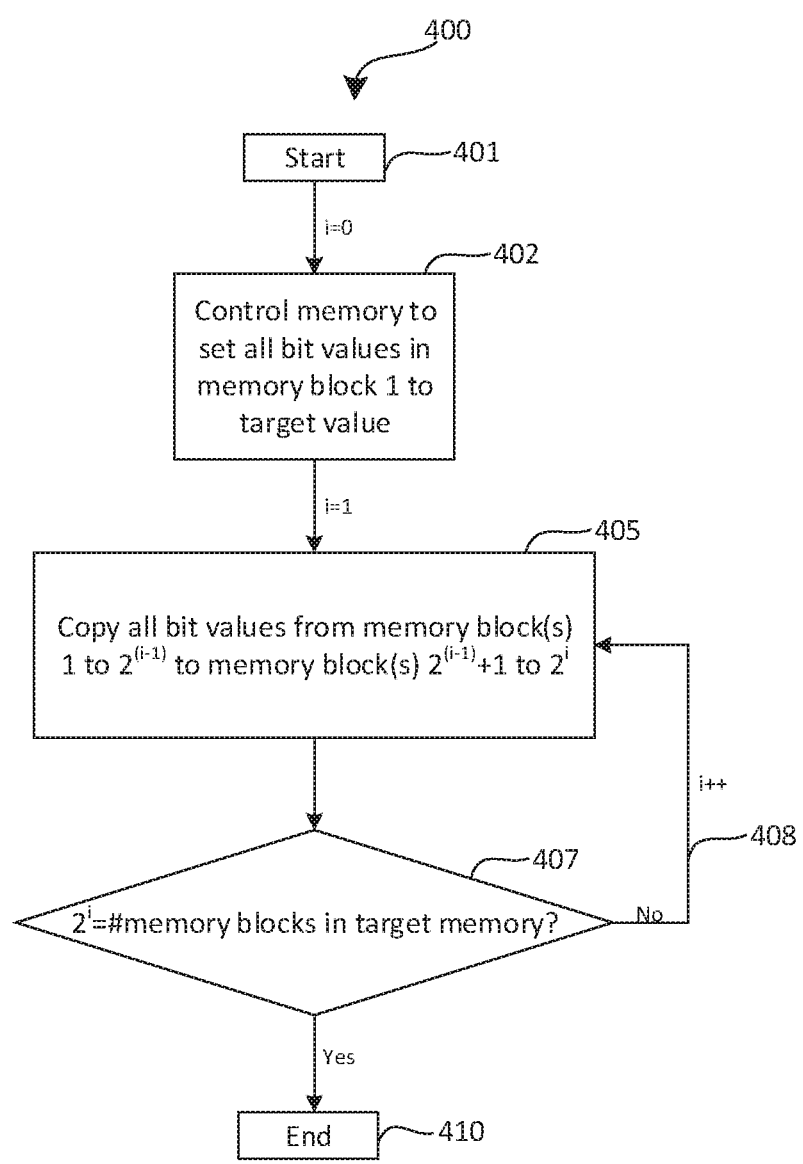
FIG. 4 shows an exemplary method which a processing device may perform using the components illustrated in FIG. 1B.

FIG. 4 shows exemplary method 400 which processing device 2200 may perform using the components illustrated in FIG. 1B. FIG. 5 illustrates results of stages 502 and 505 in terms of un-initialized and initialized memory blocks. It is appreciated that as in the case of FIGS. 2B and 3B, a plurality of memory blocks MB 1 to MB 8 illustrated in FIG. 5 is shown exemplarily and the number of eight memory blocks is used exemplarily for conciseness purposes and not to be limiting to the disclosure.

Stages 401 and 402 of method 400 as illustrated in FIG. 4 correspond to stages 301 and 302 of FIG. 3A in that after start at stage 301 bit values of an initial memory block are set to a target value (writing processing). This operation may in various aspects be performed by processor 2210 as indicated by a dashed arrow in FIG. 1B. As a result, an initial memory block 1113 (MB 1 in FIG. 5) is initialized (i=0 in FIG. 5). Subsequently, the memory controller 2220 performs copying processing at stage 405 for copying all set bit values from the initial memory block to a destination memory block (MB 2, i=1 in FIG. 5). In a subsequent processing at stage 405 (e.g. after counter index i has been increased by 1 at stage 408) all bit values from memory blocks MB 1 (the set bit values of the initial memory block) and MB 2 (all copied bit values copied in a preceding copying operation at stage 405) are copied to further destination memory blocks (MB 3 and MB 4, i=1 in FIG. 5). In various aspects, the latter processing at stage 405 may be repeated e.g. until all memory blocks of the target memory are initialized. In other words, after performing copying the set bit values to the at least one destination memory block, the memory controller 2220 performs a control for copying the set bit values and the copied bit values to further destination memory blocks. As can be taken from a comparison of FIGS. 3B and 5, in the exemplarily illustrated cases, a number of copying operations for initializing memory blocks MB 2 to MB 8 is reduced from 7 to 3 by the copying processing performed at stage 505.

A reduction of a number of copying operations may in certain aspects result in a reduction of a time required for initializing a memory range. Given the definition of the number $T_{DMA}(X$ bytes) being a time it takes to copy X bytes to a destination memory block using the copying operation, said number $T_{DMA}(X$ bytes) consists of two parts $T_{COPY}(X$ bytes) and $T_{OVER}$. Thereby, the number $T_{COPY}(X$ bytes) defines a time it takes processing hardware in general to perform a copying operation (e.g. stage 304 of method 300) and $T_{OVER}$ defines a constant time representing an overhead time that is required in order to configure e.g. a DMA engine and to employ the same for a copying operation. With these definitions, the time it takes to copy X bytes from a source memory block to a destination memory block can in certain aspects be expressed as $$T_{DMA}(X \text{ bytes}) = T_{OVER} + T_{COPY}(X \text{ bytes}).$$

In certain aspects, $T_{OVER}$ is constant regardless of the size of bytes needed to be copied, i.e. this number does not depend on a number of bytes to be copied. Further, in these aspects $T_{COPY}(X$ bytes) may depend on the number of bytes needed to be copied. Thereby, in various aspects, it may be possible to assume that $T_{COPY}$ is a linear function of the number X of bytes to be copied. For example:

$$T_{COPY}(16 \text{ KB}) = 2 * T_{COPY}(8 \text{ KB}) = 4 * T_{COPY}(4 \text{ KB}).$$

Given these definitions, it may exemplarily be possible in certain aspects to compare methods 200, 300, and 400 using the following mathematical expressions. The following exemplarily assumes that a size of a memory block (e.g. MB 1 in FIG. 2B) is 4 kB, and that a target value (e.g. zero) is to be set for each bit value within X memory blocks of 4 KB.

In various aspects, a time needed using method 200 can then exemplarily be expressed as $$T_{200}(X \text{ bytes}) = T_{MEM}(4 \text{ KB}) * X.$$

A corresponding time using method 300 can be exemplarily expressed as $$T_{300}(X \text{ bytes}) = T_{MEM}(4 \text{ KB}) + (X-1) * T_{OVER} + (X-1) * T_{COPY}(4 \text{ KB})$$

A corresponding time using method 300 can be exemplarily expressed as $$T_{400}(X \text{ bytes}) = T_{MEM}(4 \text{ KB}) + \text{Log}_2 X * T_{OVER} + (X-1) * T_{COPY}(4 \text{ KB})$$

In various aspects, given the factor $\text{Log}_2 X$ in method 400 as compared to method 300, method 400 may thus be referred to as exponential DMA method. As can be taken from the above equations, by reducing a number of necessary copying operations with method 400 (e.g. a number of DMA transactions) the number $T_{OVER}$ being a part of the necessary time is reduced. A time difference between method 300 and method 400 can thus exemplarily be expressed as $$T_{300}(X \text{ bytes}) - T_{400}(X \text{ bytes}) = (X-1-\text{Log}_2 X \text{ bytes}) * T_{OVER}.$$

In other words, the larger X, i.e. the larger a number of memory blocks to be initialized, the faster method 400 may be as compared to method 300.

Exemplarily assuming for an example calculation that 4 MB (1024*4 KB blocks, X=1024) of memory are to be initialized, $T_{MEM}(4$ KB)=1 msec, $T_{COPY}(4$ KB)=0.05 msec and $T_{OVER}$=0.05 msec, the above equations may in certain aspects result in the following exemplary values:

$$T_{200}(1 \text{ MB}) = 1 \text{ msec} * 1024 = 1024 \text{ msec},$$

$$T_{300}(1 \text{ MB}) = 1 \text{ msec} + 1023 * 0.05 \text{ msec} + 1023 * 0.05 \text{ msec} = 103.3 \text{ msec, and}$$

$$T_{400}(1 \text{ MB}) = 1 \text{ msec} + 10 * 0.05 \text{ msec} + 1023 * 0.05 \text{ msec} = 52.65 \text{ msec}$$

Figure 6:
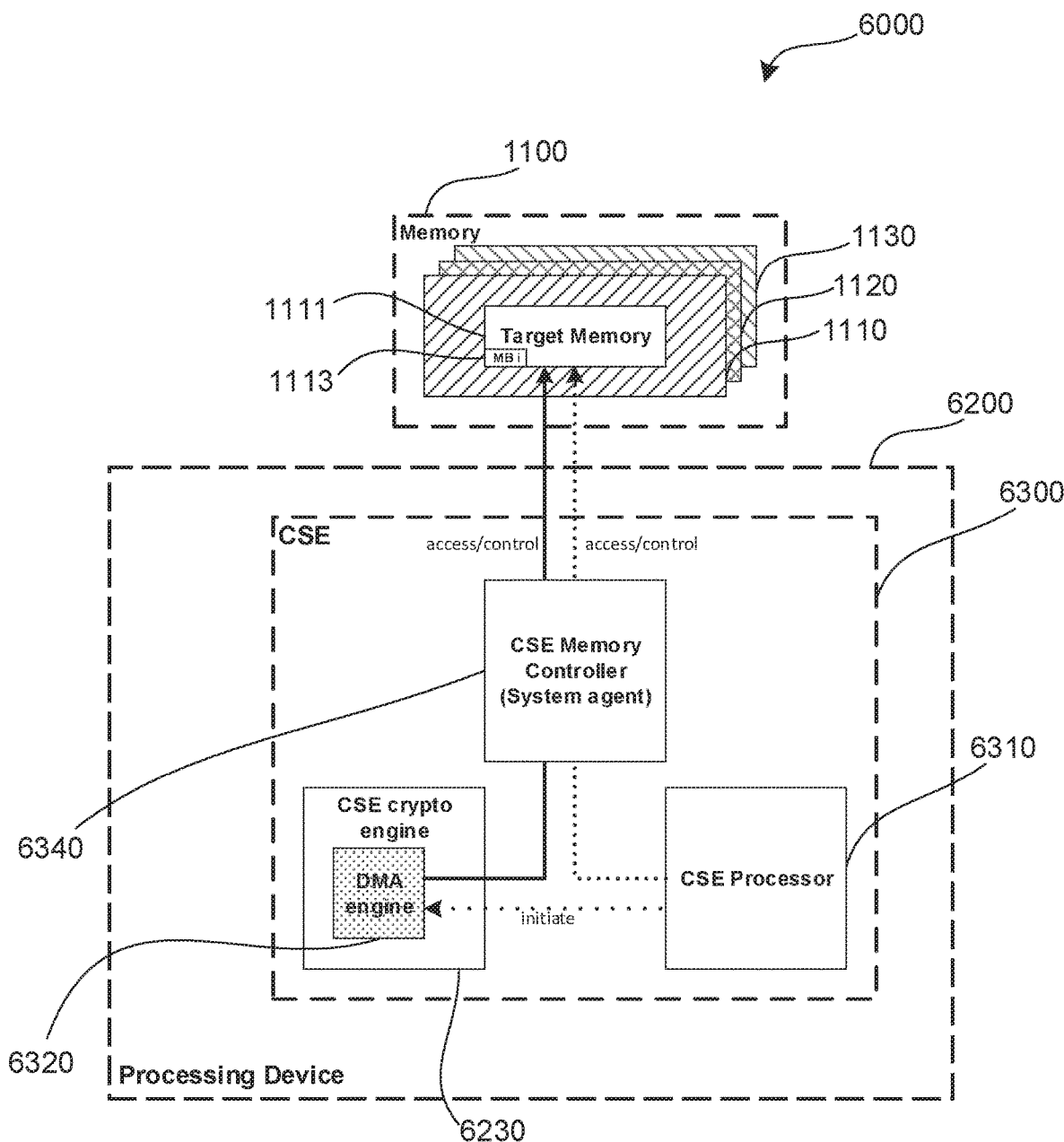
FIG. 6 shows a further example of a system that includes a memory and a processing device.

FIG. 6 shows a further example of a system 6000 that includes a memory 1100 and a processing device 6200. Processing device 6200 is configured to perform method 400 shown in FIG. 4 as described above for the case of processing device 2200, whereby DMA engine 6320 is an example of a memory controller 2220 and converged security engine (CSE) processor 6310 is an example of a processor 2210. Like reference characters refer to the same parts shown also in FIGS. 1A and 1B and a corresponding description is omitted for purposes of conciseness. As shown in FIG. 6, in various aspects, the processing device 6200 may include a converged security engine (CSE) 6300 which in various aspects may be implemented as a hardware component (e.g. a system on a chip (SOC) component), or which may be implemented with standalone components. CSE 6300 includes CSE processor 6310, CSE crypto engine 6230, DMA engine 6320, and CSE memory controller. As illustrated, DMA engine 6320 may be implemented as a hardware component of CSE crypto engine 6230. As illustrated, CSE processor 6310 and DMA engine 6320 may access memory 1100 in various aspects via the CSE memory controller 6340 for performing the functions described above for processor 2210 and memory controller 2220.

In the example of FIG. 6, CSE 6300 may run within a dedicated environment, e.g. on a dedicated platform, of a control system e.g. a control system for automotive applications such as rear or backup camera with corresponding audio equipment. CSE 6300 may be used for loading and authenticating firmware of components from a memory such as a ROM, EPROM or flash memory into a corresponding system memory upon e.g. power-on of the control system e.g. when a vehicle is turned on. CSE 6300 may in certain aspects be implemented to provide security functions such as authenticating e.g. firmware before loading the same into a system memory. In addition, the CSE 6300 is configured to initialize the system memory (e.g. target memory 1111) by setting all bit values within memory blocks to a target value, e.g. to a zero value. In various aspects, such initialization operation provides additionally enhanced security as it may prevent presence e.g. of malware or malfunctioning software within an initialized memory.

The following examples pertain to further aspects of this disclosure:

The subject matter of Example 1 is a processing device comprising: a memory comprising memory blocks configured to store bit values, wherein bit values of an initial memory block are set to a target value; a memory controller configured to perform control of copying bit values from at least one source memory block to at least one destination memory block; the memory controller further configured to: copy the set bit values to the at least one destination memory block, and subsequently copy the set bit values and the (all) copied bit values to further destination memory blocks.

In Example 2, the subject matter of Example 1 may optionally further include wherein the memory controller is configured to copy the set bit values and the copied bit values to further destination blocks at least one further time.

In Example 3, the subject matter of any one of Examples 1 or 2 may optionally further comprise a processor configured to control the memory to set bit values of the initial memory block to the target bit value before the memory controller is configured to copy the set bit values to the at least one destination memory block.

In Example 4, the subject matter of any one of Examples 1 to 3 may optionally further include wherein the bit values of the initial memory block are set to the target value to initialize the initial memory.

In Example 5, the subject matter of any one of Examples 2 to 4 may optionally further include wherein the memory controller is configured to copy the set bit values and the copied bit values to further destination memory blocks until the entire memory is initialized.

In Example 6, the subject matter of any one of Examples 3 to 5 may optionally further include wherein a size of a memory block is at least 100 times the register size of the processor.

In Example 7, the subject matter of any one of Examples 1 to 6 may optionally further include wherein the memory is a system memory of an automotive control system, and wherein the memory controller is configured to control an operation for loading firmware for at least one automotive electrical component into the memory.

In Example 8, the subject matter of Example 7 may optionally further include wherein the memory controller is configured to authenticate the firmware.

In Example 9, the subject matter of any one of Examples 7 to 9 may optionally further include wherein the automotive electrical component is one selected at least from the group consisting of camera, onboard camera, backup camera, night vision camera, and or sound generator connected to proximity sensors.

In Example 10, the subject matter of any one of Examples 1 to 9 may optionally further include wherein the memory controller is implemented as hardware in the processing device.

In Example 11, the subject matter of any one of Examples 1 to 10 may optionally further include wherein the memory controller is a direct memory access (DMA) controller implemented as hardware in the processing device.

In Example 12, the subject matter of any one of Examples 1 to 11 may optionally further include wherein the memory controller is implemented as a hardware component of a security engine for loading and authenticating firmware for automotive electrical components.

In Example 13, the subject matter of any one of Examples 1 to 12 may optionally further include wherein the target value is zero.

The subject matter of Example 14 is a processing method comprising: setting bit values of an initial memory block among memory blocks of a memory to a target value; and performing by a memory controller: copying the set bit values to the at least one destination memory block, subsequently copying the set bit values and the copied bit values to further destination memory blocks.

In Example 15, the subject matter of Example 14 may optionally further include wherein the copying the set bit values and the copied bit values to further destination memory blocks is repeated at least once.

In Example 16, the subject matter of any one of Examples 14 to 15 may optionally further comprise setting, by a processor, the bit values of the initial memory block to the target bit value before copying the set bit values to the at least one destination memory block.

In Example 17, the subject matter of any one of Examples 14 to 16 may optionally further include wherein setting the bit values of the initial memory block to the target value is performed to initialize the initial memory.

In Example 18, the subject matter of any one of Examples 15 to 17 may optionally further include wherein the copying the set bit values and the copied bit values to further destination memory blocks is performed until the entire memory is initialized.

In Example 19, the subject matter of any one of Examples 16 to 18 may optionally further include wherein a size of a memory block is at least 100 times the register size of the processor.

In Example 20, the subject matter of any one of Examples 14 to 19 may optionally further include wherein the memory is a system memory of an automotive control system, the method comprising controlling an operation for loading firmware for at least one automotive electrical component into the memory.

In Example 21, the subject matter of Example 20 may optionally further include comprise authenticating the firmware.

In Example 22, the subject matter of any one of Examples 20 to 21 may optionally further include wherein the automotive electrical component is one selected at least from the group consisting of camera, onboard camera, backup camera, night vision camera, and or sound generator connected to proximity sensors.

In Example 23, the subject matter of any one of Examples 14 to 22 may optionally further include wherein the memory controller is implemented as hardware in the processing device.

In Example 24, the subject matter of any one of Examples 14 to 23 may optionally further include wherein the memory controller is a direct memory access (DMA) controller implemented as hardware in the processing device.

In Example 25, the subject matter of any one of Examples 14 to 24 may optionally further include wherein the memory controller is implemented as a hardware component of a security engine for loading and authenticating firmware for automotive electrical components.

In Example 26, the subject matter of any one of Examples 14 to 25 may optionally further include wherein the target value is zero.

The subject matter of Example 27 is a processing device comprising: a memory comprising memory blocks configured to store bit values, wherein bit values of an initial memory block are set to a target value; one or more processors configured to perform control of copying bit values from at least one source memory block to at least one destination memory block; the one or more processors further configured to: copy the set bit values to the at least one destination memory block, and subsequently copy the set bit values and the copied bit values to further destination memory blocks.

In Example 28, the subject matter of Example 27 may optionally further include wherein the one or more processors are configured to copy the set bit values and the copied bit values to further destination blocks at least one further time.

In Example 29, the subject matter of any one of Examples 27 to 28 may optionally further comprise one or more processors configured to control the memory to set bit values of the initial memory block to the target bit value before the one or more processors are configured to copy the set bit values to the at least one destination memory block.

In Example 30, the subject matter of any one of Examples 27 to 29 may optionally further include wherein the bit values of the initial memory block are set to the target value to initialize the initial memory.

In Example 30, the subject matter of any one of Examples 28 to 30 may optionally further include wherein the one or more processors are configured to copy the set bit values and the copied bit values to further destination memory blocks until the entire memory is initialized.

In Example 31, the subject matter of any one of Examples 29 to 31 may optionally further include wherein a size of a memory block is at least 100 times the register size of the processor.

In Example 32, the subject matter of any one of Examples 27 to 32 may optionally further include wherein the memory is a system memory of an automotive control system, and wherein the one or more processors are configured to control an operation for loading firmware for at least one automotive electrical component into the memory.

In Example 33, the subject matter of Example 33 may optionally further include wherein the one or more processors are configured to authenticate the firmware.

In Example 34, the subject matter of any one of Examples 33 to 34 may optionally further include wherein the automotive electrical component is one selected at least from the group consisting of camera, onboard camera, backup camera, night vision camera, and or sound generator connected to proximity sensors.

In Example 35, the subject matter of any one of Examples 27 to 35 may optionally further include wherein the one or more processors are implemented as hardware in the processing device.

In Example 36, the subject matter of any one of Examples 27 to 36 may optionally further include wherein the one or more processors are a direct memory access (DMA) controller implemented as hardware in the processing device.

In Example 38, the subject matter of any one of Examples 27 to 37 may optionally further include wherein the one or more processors are implemented as a hardware component of a security engine for loading and authenticating firmware for automotive electrical components.

In Example 39, the subject matter of any one of Examples 27 to 38 may optionally further include wherein the target value is zero.

What is claimed is:

1. A processing device comprising:
   a memory comprising memory blocks configured to store bit values, wherein bit values of an initial memory block of a first size are set to a target value;
   a memory controller configured to perform control of copying bit values from at least one source memory block of the first size to at least one destination memory block of the first size;
   the memory controller further configured to:
      copy the set bit values from the initial memory block of the first size to the at least one destination memory block of the first size, and
      subsequently copy the set bit values from the initial memory block of the first size and the copied bit values from the at least one destination memory block of the first size to further destination memory blocks of a second size, wherein the second size is twice the first size.

2. The processing device according to claim 1, wherein the memory controller is configured to copy the set bit values from the initial memory block and the copied bit values from the at least one destination memory block to further destination memory blocks at least one further time.

3. The processing device according to claim 1, further comprising a processor configured to control the memory to set bit values of the initial memory block to the target value before the memory controller is configured to copy the set bit values from the initial memory block to the at least one destination memory block.

4. The processing device according to claim 1, wherein the bit values of the initial memory block are set to the target value to initialize the initial memory.

5. The processing device according to claim 2, wherein the memory controller is configured to copy the set bit values from the initial memory block and the copied bit values from the at least one destination memory block to further destination memory blocks until the entire memory is initialized.

6. The processing device according to claim 3, wherein a size of a memory block is at least 100 times a register size of the processor.

7. The processing device according to claim 1, wherein the memory is a system memory of an automotive control system, and wherein the memory controller is configured to control an operation for loading firmware for at least one automotive electrical component into the memory.

8. The processing device according to claim 7, wherein the memory controller is configured to authenticate the firmware.

9. The processing device according to claim 7, wherein the automotive electrical component is one selected at least from the group consisting of camera, onboard camera, backup camera, night vision camera, and or sound generator connected to proximity sensors.

10. The processing device according to claim 1, wherein the memory controller is implemented as hardware in the processing device.

11. The processing device according to claim 1, wherein the memory controller is a direct memory access (DMA) controller implemented as hardware in the processing device.

12. The processing device according to claim 1, wherein the memory controller is implemented as a hardware component of a security engine for loading and authenticating firmware for automotive electrical components.

13. The processing device according to claim 1, wherein the target value is zero.

14. A processing device comprising:
   a memory comprising memory blocks configured to store bit values, wherein bit values of an initial memory block of a first size are set to a target value;
   one or more processors configured to perform control of copying bit values from at least one source memory block of the first size to at least one destination memory block of the first size;
   the one or more processors further configured to:
      copy the set bit values from the initial memory block of the first size to the at least one destination memory block of the first size, and
      subsequently copy the set bit values from the initial memory block of the first size and the copied bit values from the at least one destination memory block of the first size to further destination memory blocks of a second size, wherein the second size is twice the first size.

15. The processing device according to claim 14, wherein the one or more processors are configured to copy the set bit values from the initial memory block and the copied bit values from the at least one destination memory block to further destination blocks at least one further time.

16. The processing device according to any one of claim 14, further comprising one or more processors configured to control the memory to set bit values of the initial memory block to the target value before the one or more processors are configured to copy the set bit values from the initial memory block to the at least one destination memory block.

17. The processing device according to claim 14, wherein the bit values of the initial memory block are set to the target value to initialize the initial memory.

18. The processing device according to claim 15, wherein the one or more processors are configured to copy the set bit values from the initial memory block and the copied bit values from the at least one destination memory block to further destination memory blocks until the entire memory is initialized.

19. The processing device according to claim 16, wherein a size of a memory block is at least 100 times the register size of the processor.

20. The processing device according to claim 14, wherein the memory is a system memory of an automotive control system, and wherein the one or more processors are configured to control an operation for loading firmware for at least one automotive electrical component into the memory.

* * * * *